(12) United States Patent
Wodrich et al.

(10) Patent No.: US 6,948,784 B2
(45) Date of Patent: Sep. 27, 2005

(54) TRACK PIN BUSHING HAVING A METALLURGICALLY BONDED COATING

(75) Inventors: Timothy D. Wodrich, Peosta, IA (US); Todd B. Niemann, Dubuque, IA (US); Gopal S. Revankar, Moline, IL (US)

(73) Assignee: Deere & Company, Moline, IL (US)

( * ) Notice: Subject to any disclaimer, the term of this patent is extended or adjusted under 35 U.S.C. 154(b) by 13 days.

(21) Appl. No.: 10/090,617

(22) Filed: Mar. 6, 2002

(65) Prior Publication Data

US 2003/0168912 A1 Sep. 11, 2003

(51) Int. Cl.$^7$ .......................... B60D 55/12; F16G 13/02; B21D 53/10; F16C 33/02
(52) U.S. Cl. .................... 305/202; 305/194; 29/898.13; 384/276; 384/282
(58) Field of Search ................................. 305/103–105, 305/100, 202, 192, 194, 195, 199, 203, 106; 384/270, 297, 825, 912–913, 625, 42, 129, 158, 191.2, 276, 282, 283; 29/898, 898.04, 898.042, 898.054, 898.12, 898.13, 898.14; 474/155, 156, 157, 206

(56) References Cited

U.S. PATENT DOCUMENTS

| | | | |
|---|---|---|---|
| 2,334,350 A | * 11/1943 | Neuhaus .................. 29/898.14 |
| 3,310,870 A | 3/1967 | Parikh et al. |
| RE27,851 E | 12/1973 | Alessi et al. |
| 4,042,282 A | 8/1977 | Haslett et al. |
| 4,175,163 A | 11/1979 | Ikeno et al. |
| 4,182,394 A | 1/1980 | Cason, Jr. |
| 4,218,494 A | 8/1980 | Belmondo et al. |
| 4,625,810 A | 12/1986 | Edmisson |
| 4,629,353 A | * 12/1986 | Burke ..................... 29/898.14 |
| 4,682,987 A | 7/1987 | Brady et al. |
| 4,776,566 A | 10/1988 | Girdley |

(Continued)

FOREIGN PATENT DOCUMENTS

| | | |
|---|---|---|
| EP | 0 302 988 | 2/1989 |
| EP | 0 459 637 A1 | 12/1991 |
| GB | 1 572 963 | 8/1980 |
| JP | 60-89503 | 5/1985 |
| JP | 60-89504 | 5/1985 |

OTHER PUBLICATIONS

Patent Abstracts of Japan, vol. 2000, No. 15, Apr. 6, 2001, JP 2000 343129 A.

*Primary Examiner*—Russell D. Stormer
*Assistant Examiner*—Jason R. Bellinger
(74) *Attorney, Agent, or Firm*—Burns, Doane, Swecker & Mathis, L.L.P.

(57) ABSTRACT

A track pin bushing for cooperating with a track pin in an endless track has a tubular body with a metallurgically bonded wear-resistant coating and a method for forming such a coated track pin bushing is taught herein. The tubular body, formed of an iron-based alloy, has an outer surface that is carburized and quenched, i.e., case-hardened, in at least a section thereof. At least a portion of the case hardened section has been removed to a depth sufficient to expose a non-carburized layer of the iron-based alloy. A hard metal alloy slurry is disposed on the non-carburized layer and forms a metallurgical bond between the non-carburized layer and the coated unfused slurry by fusing the hard metal alloy. The thickness of the unfused slurry is adjusted to be from 1.67 to 2.0 times a final thickness of the wear-resistant coating. The wear-resistant coating comprises a fused, metal alloy comprising at least 60% iron, cobalt, nickel, or alloys thereof. The portion of the outer surface with the wear-resistant coating corresponds to a contact surface adapted to engage with a drive sprocket in the endless track of the track-type vehicle.

30 Claims, 4 Drawing Sheets

U.S. PATENT DOCUMENTS

| | | |
|---|---|---|
| 4,930,675 A | 6/1990 | Bedford et al. |
| 4,954,058 A | 9/1990 | Revankar |
| 5,027,878 A | 7/1991 | Revankar et al. |
| 5,126,104 A | 6/1992 | Anand et al. |
| 5,249,868 A * | 10/1993 | Watts .................. 305/202 |
| 5,267,600 A | 12/1993 | Revankar |
| 5,288,353 A | 2/1994 | Revankar |
| 5,299,620 A | 4/1994 | Revankar et al. |
| 5,383,513 A | 1/1995 | Revankar |
| 5,443,916 A | 8/1995 | Revankar |
| 5,456,323 A | 10/1995 | Hill |
| 5,702,667 A | 12/1997 | Pond |
| 5,879,743 A | 3/1999 | Revankar |
| 6,045,200 A | 4/2000 | Anderton et al. |
| 6,074,022 A * | 6/2000 | Anderton et al. ........... 305/103 |
| 6,089,683 A | 7/2000 | Anderton et al. |
| 6,145,941 A | 11/2000 | Anderton et al. |
| 6,402,862 B1 * | 6/2002 | Anderton et al. ........... 148/570 |
| 6,485,116 B1 * | 11/2002 | Oertley ....................... 305/200 |
| 6,565,161 B2 * | 5/2003 | Anderton .................... 305/103 |
| 6,666,013 B2 * | 12/2003 | Nakagawa et al. ......... 474/206 |

* cited by examiner

TRACK PIN BUSHING HAVING A METALLURGICALLY BONDED COATING

FIELD OF THE INVENTION

The present invention relates generally to track pin bushings for endless tracks of track-type machines. In particular, it relates to track pin bushings having a wear resistant coating that is metallurgically bonded to an outside diameter surface of the track pin bushing where a drive sprocket engages and disengages the surface.

STATE OF THE ART

Figure 1:
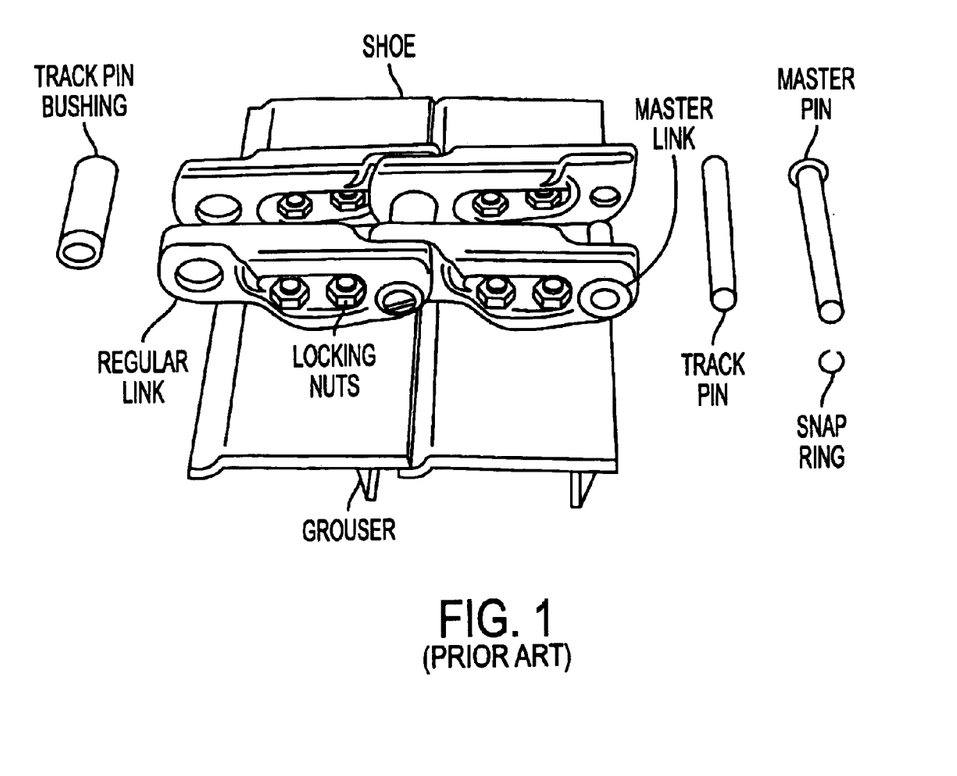
FIG. 1 shows the components of a typical endless track including a track bushing.

In the discussion of the state of the art that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention An endless track is a chain made up of links, track pin bushings, track pins, and shoes. FIG. 1 shows these components in a representative section of a track on a track-type machine, i.e., a crawler tractor. Each section of the track is a pair of links fastened together with a track pin bushing at one end and a track pin at the other end. The track pin fits inside the bushing to hold the next pair of links. Both the track pin and the track pin bushing are typically "press fit" into the links so the section does not work apart during the service life of the track. One track pin on each track, the so-called master pin, is held in by a snap ring to allow removal and separation of the track, for example, when performing repairs or maintenance of the track. A track shoe, having a desired grip or grouser determined by the environment of intended use (e.g., clay, slit, loam, gravel, snow, mud, or hard surfaces) is bolted to each section to provide traction.

The track pin bushings in endless tracks of a track-type machine are subjected to very severe operating environments. For example, debris, soil, rocks and so forth can enter the track and undercarriage of a track-type machine, such as a crawler tractor, during operation. These materials can subsequently accumulate between the engaging surfaces of the track pin bushing and the drive sprocket teeth, pack into the track and tighten the track tension, and/or directly grind, wear, pit, scratch or crack the surface of the track pin bushing. A track that is adjusted too tight can increase friction and cause accelerated wear to track components such as track pins and track pin bushings. In an extreme case, severely tight track adjustment can cause the track to run extremely hot and "draw-back" the hardness of track pins and track pin bushings, i.e., heat treat the components resulting in a reduction in the components' hardness, and even cause the track pins and track pin bushings to fuse together. At the other end of the spectrum, a too loose track can allow drive sprocket teeth to jump links, especially in reverse, causing wear to the teeth and the track pin bushings.

There are two types of wear on track pins and track pin bushings-external wear and internal wear. External wear takes place on the outer diameter of the track pin bushings in the area contacted by the drive sprocket teeth. This contact area is about ⅓ or more of the surface of the track pin bushing and occupies the majority of the center length of the track pin bushing. Internal wear occurs on the outside diameter of the track pin and the inside diameter of the track pin bushing. Additionally, where the track pin bushings are fitted into the track link counterbores, internal wear can occur on the outside diameter of the ends of the track pin bushings. Thus, current track pins and track pin bushings in endless tracks experience wear and stress which can negatively impact the service life of the track pin bushing.

Current track pins and track pin bushings are typically formed from materials that are hardened to decrease wear and increase service life. For example, current track pins are case hardened by carburizing the alloy and then quenching. However, these materials and methods still result in a relatively short service life. Thus, in addition to material selection for hardness and wear resistance, current track pins and track pin bushings are either turned or replaced to present a new wear surface to the sprocket and consequently extend service life. See, for example, Louis R. Hathaway, Ed., "Tires and Tracks, Fundamentals of Service", Moline, IL.: Deere and Company, 1986, pp. 47–67. However, the track pins and track pin bushings must be turned prior to being worn past the wear limit, or they will not be serviceable. Thus, frequent inspection and maintenance of track pins and track pin bushings occurs to identify and ameliorate components that have worn, resulting in the associated down time of equipment and personnel.

Coating a metal surface with another metal or metal alloy to enhance appearance, protect against corrosion, or improve resistance to wear is often referred to as "hardfacing" or "hard surfacing." For example, see Alessi U.S. Pat. No. Re. 27,851, Revankar U.S. Pat. No. 5,027,878 and No. 5,443, 916, Brady, et al., U.S. Pat. No. 4,682,987, and Hill U.S. Pat. No. 5,456,323.

Hardfacing is often done by fusing a powdered, hard metal alloy onto a metal surface. However, one problem with this method of hardfacing is forming a metallurgical bond between the metal surface and the hardfacing material, particularly when other portions, i.e, the uncoated portions, of the metal surface are to be subsequently treated to obtain a wear-resistant character, i.e., through a heat treatment process that occurs after the hardfacing. For example, in endless track applications, metal parts subject to wear can be case hardened to improve wear resistance. However, wear-resistant coatings applied to carburized or case-hardened surfaces do not readily metallurgically bond to the surface. Further, application of the wear-resistant coating prior to carburizing results in oxidation of the wear-resistant coating during subsequent heat treatments with an adverse impact on the wear-resistant properties of the coating.

Accordingly, longer wearing surfaces on components of endless tracks used in track-type machines, such as track pin bushings, is desired to extend the service life and to reduce the long-term maintenance cost associated with endless tracks. Further, a method of producing such a longer wearing surface by coating with a wear-resistant alloy while still obtaining a desired wear resistance of the uncoated portions of the component by other suitable means, i.e., case hardening, is desirable.

OBJECTS AND SUMMARY OF THE INVENTION

It is an object of this invention to avoid or alleviate the problems of the prior art.

It is further an object of this invention to provide a wear-resistant coating on at least a section of a carburized component of an endless track.

In one aspect of the invention, there is provided a track pin bushing for cooperating with a track pin in an endless track, the track pin bushing comprising:

a tubular body formed of an iron-based alloy with a first end and a second end, an outer surface that is case-hardened in at least a section thereof, and an inner surface having an inner diameter, wherein the inner diameter defines the circumference of an axial bore extending from the first end to the second end and at least a portion of the case hardened section has been removed to a depth sufficient to expose a non-carburized layer of the iron-based alloy; and a wear-resistant coating metallurgically bonded to said non-carburized layer, the wear-resistant coating comprising a fused, hard metal alloy comprising at least 60% iron, cobalt, nickel, or alloys thereof.

In a second embodiment, there is provided a track pin bushing for cooperating with a track pin in an endless track, the track pin bushing comprising:

a first end and a second end;

an inner surface having an inner diameter, wherein the inner diameter defines the circumference of an axial bore extending from the first end to the second end;

an outer surface having a first outer diameter at a first end section and a second end section and a second outer diameter at a middle section therebetween, wherein the second outer diameter is greater than the first outer diameter;

an annular groove located in at least a portion of said middle section and extending over a majority of an axial length of said middle section; and a wear-resistant coating disposed in said annular groove and metallurgically bonded to the track pin bushing, the wear-resistant coating comprising a fused, hard metal alloy comprising at least 60% iron, cobalt, nickel, or alloys thereof.

In a further aspect of the invention, there is provided a method for hardfacing with a wear-resistant coating a metal surface of a carburized metal part, the method comprising the steps of:

removing the carburized metal from at least a portion of the metal surface to a depth sufficient to expose a non-carburized layer of the metal, the portion defining an area to be coated;

coating the area with a slurry comprising a fusible, hard metal alloy with at least 60% iron, cobalt, nickel, or alloys thereof in the form of a finely divided powder and polyvinyl alcohol; and forming a metallurgical bond between the area and the coated slurry to form the wear-resistant coating.

In a second embodiment, there is provided a method for hardfacing a metal surface of a track pin bushing with a wear-resistant coating, the track pin bushing comprising an outer surface having an outer diameter, an inner surface having an inner diameter, a first end and a second end, wherein the inner diameter defines the circumference of an axial bore extending from the first end to the second end and cooperating with a track pin in an endless track, the method comprising the steps of:

carburizing at least a portion of the track pin bushing to produce a surface having a carburized depth;

preparing at least a portion of the carburized surface of the track pin bushing in an area to be coated by removing the carburized metal to a depth sufficient to expose a decarburized layer;

coating the exposed decarburized layer of the track pin bushing with a slurry comprising a fusible, hard metal alloy with at least 60% iron, cobalt, nickel, or alloys thereof in the form of a finely divided powder and polyvinyl alcohol;

forming the wear-resistant coating by metallurgically bonding the exposed decarburized layer and the slurry; and case hardening a non-prepared and carburized surface of the track pin bushing by quenching.

In an additional embodiment, there is provided a method for hardfacing a metal surface of a track pin bushing with a wear-resistant coating, the method comprising:

forming the track pin bushing having a first end and a second end, an inner surface having an inner diameter, wherein the inner diameter defines the circumference of an axial bore extending from the first end to the second end, an outer surface having a first outer diameter at a first end section and a second end section and a second outer diameter at a middle section therebetween, the second outer diameter being greater than the first outer diameter;

carburizing the track pin bushing to produce a carburized outer surface, inner surface and first and second end sections, each with a carburization depth;

removing carburized steel from at least a portion of said middle section to reduce the second diameter by at least the carburization depth, coating said middle portion in the area of the reduced diameter with a slurry comprising a fusible, hard metal alloy with at least 60% iron, cobalt, nickel, or alloys thereof in the form of a finely divided powder and polyvinyl alcohol;

adjusting a thickness of the slurry to have an outer surface that is concentric with the axial bore, wherein the thickness of the concentric outer surface is from 1.67 to 2.0 times a final thickness of the wear-resistant coating;

forming the wear-resistant coating by metallurgically bonding said portion of said middle portion and the slurry; and case hardening at least the inner diameter and first and second ends.

In an additional aspect of the invention, there is provided a track pin bushing in combination with a track pin for connecting adjacent track links in an endless track of a crawler track, the track pin bushing including an axial bore therethrough in which is positioned the track pin, the track pin bushing comprising:

a tubular body formed of a case hardened iron-based alloy with a first end and a second end, an outer surface, and an inner surface having an inner diameter, wherein the inner diameter defines the circumference of the axial bore extending from the first end to the second end and a portion of the outer surface has been removed to a depth sufficient to expose a non-carburized layer of the iron-based alloy; and a wear-resistant coating metallurgically bonded to said portion, the wear-resistant coating comprising a fused, hard metal alloy comprising at least 60% iron, cobalt, nickel, or alloys thereof.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF PREFERRED EMBODIMENTS

Figure 2:
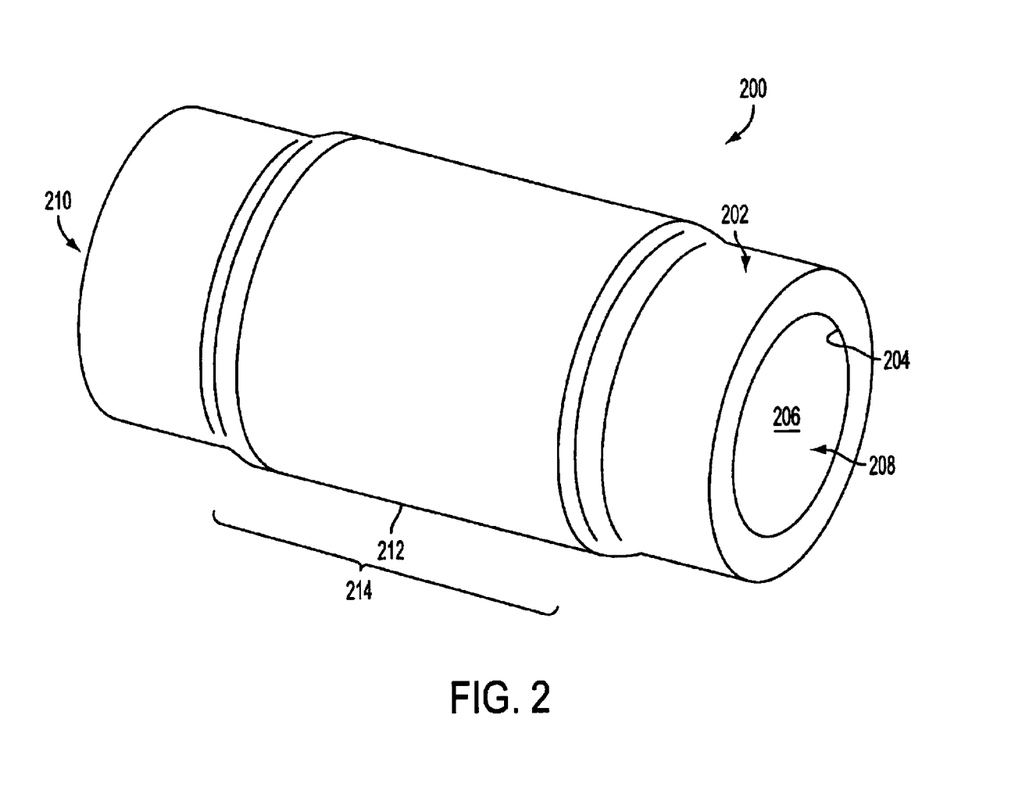
FIG. 2 shows a schematic perspective view of a track pin bushing.

A track pin bushing cooperates with a track pin in an endless track of a track-type machine, such as a crawler tractor. In an exemplary embodiment and as shown in FIG. 2, the track pin bushing 200 has a tubular body formed of an iron-based alloy, at least a section of which is case hardened, i.e., the outer surface, the inner surface, the ends, or portions or combinations thereof have been carburized and quenched. The track pin bushing 200 has an outer surface 202 having an outer diameter and an inner surface 204 having an inner diameter. The inner diameter defines the circumference of an axial bore 206 extending from the first end 208 to the second end 210 of the track pin bushing 200. A wear-resistant coating 212 is disposed on and metallurgically bonded to a portion 214 of the track pin bushing 200 that has been exposed by the removal of at least a portion of the case hardened section to a depth sufficient to expose a non-carburized layer of the iron-based alloy.

Figure 3A:
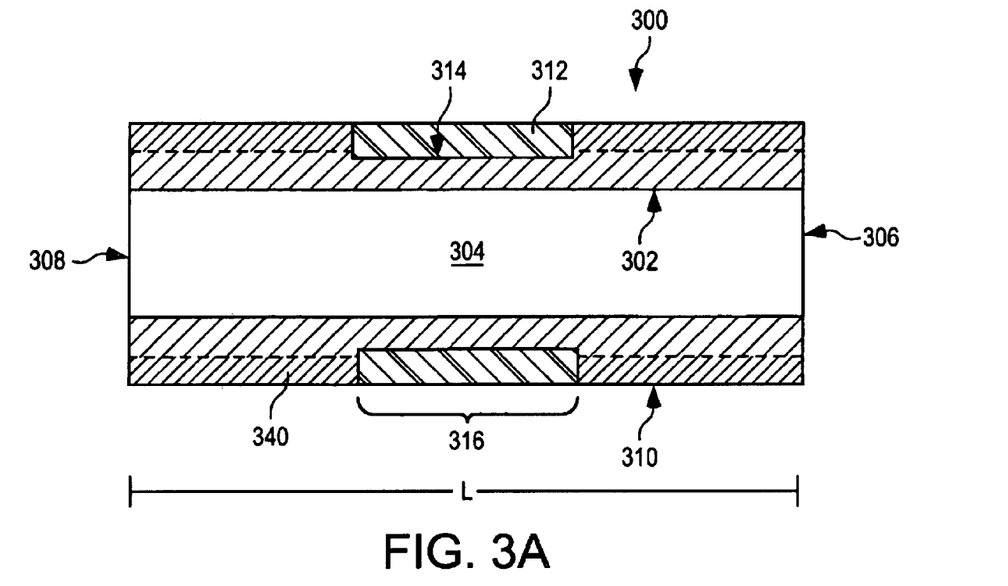
FIGS. 3A–B shows a schematic axial cross-section of A) a hardfaced track pin bushing with an uniform outer diameter along its length and B) a hardfaced track pin bushing with an increased radius at a central portion.

In an exemplary embodiment, a hardfaced track pin bushing has an outer surface with a uniform, i.e., non-varying, outer diameter. At least a portion of the outer surface 340 has been case hardened, i.e., carburized and quenched. As shown in FIG. 3A, the track pin bushing 300 has an inner surface 302 having an inner diameter that defines the circumference of an axial bore 304 extending from the first end 306 to the second end 308 of the track pin bushing 300. An outer surface 310 has an outer diameter that is uniform along the axial length L of the track pin bushing 300. A wear-resistant coating 312 is metallurgically bonded to a non-carburized layer 314 exposed by the removal of a portion 316 of the carburized and sequentially quenched outer surface 310.

Figure 3B:
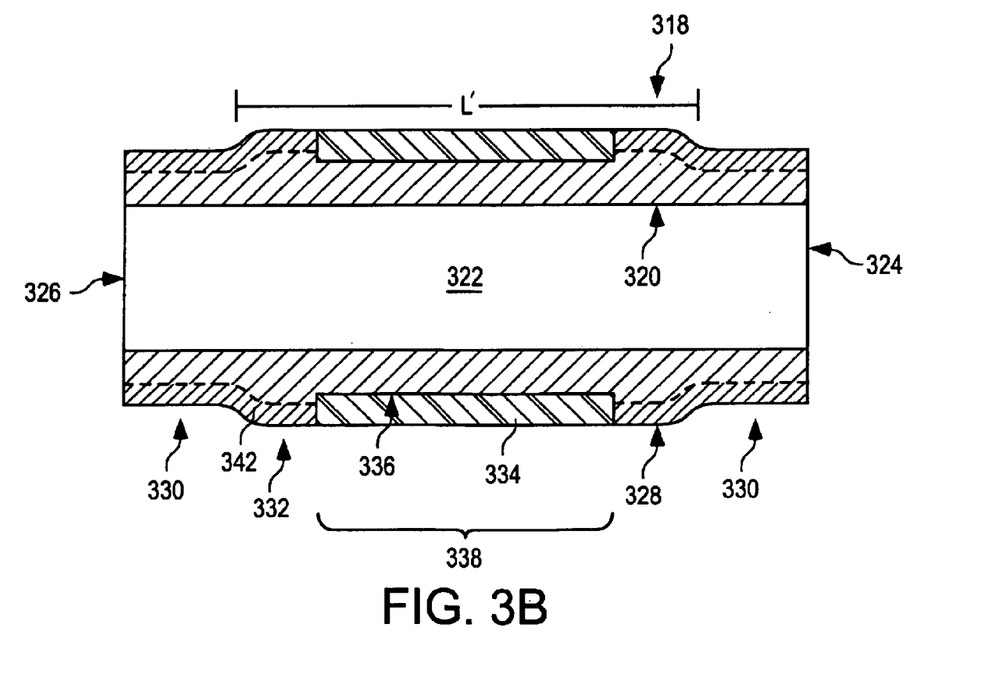

In another exemplary embodiment, a hardfaced track pin bushing has an outer surface with a nonuniform, i.e., varying, outer diameter. At least a portion of the outer surface 342 has been case hardened, i.e., carburized and quenched. As shown in FIG. 3B, the track pin bushing 318 has an inner surface 320 having an inner diameter that defines the circumference of an axial bore 322 extending from the first end 324 to the second end 326 of the track pin bushing 318. An outer surface 328 has at least one first section 330 with a first outer diameter and at least one second section 332 with a second outer diameter. In the embodiment as shown, the second section 332 is a central portion between first sections 330 which are located at both the first end 324 and the second end 326. The second outer diameter is greater than the first outer diameter resulting in the second section 332 protruding from the track pin bushing 318 over an axial length L'. A wear-resistant coating 334 is disposed in and metallurgically bonded to a non-carburized layer 336 exposed by the removal of the carburized material from at least a portion 338 of the second section 332.

In both the embodiments having a uniform outer diameter and having a nonuniform outer diameter, the exposed non-carburized layer 314, 336 and thus the wear-resistant coating 312, 334 disposed therein and bonded thereto, extends over a portion of the outer surface 310, 328 that corresponds to at least the contact surface adapted to engage with a drive sprocket in the endless track of a track-type machine. In the exemplary embodiments shown, the exposed layer 314, 336 is formed by the removal of carburized material and is in the form of an annular groove or other well or cavity-like feature formed by the removal of carburized material. However, the exposed layer can be any shape or form as long as the exposed layer is a non-carburized surface to which the wear-resistant coating can fuse by a metallurgical bond.

In one aspect and in an application for a crawler tractor designated as John Deere 850C Series II Crawler, the wear-resistant coating extends over a majority of an axial length of the track pin bushing. In other aspects, the wear-resistant coating extends over an axial length corresponding to the contact surface for the particular application, i.e, for the particular track-type machine, and may be a minority length, an end or plurality of ends, a groove or plurality of grooves, and so forth, as readily discernable by those of ordinary skill in the art.

In a further aspect, the wear-resistant coating has an outer surface flush with the outer surface of the track pin bushing, as shown in FIG. 3A. In alternative aspects, the wear-resistant coating has an outer surface that is not flush with the outer surface but extends beyond the outer surface to provide a raised coating or recedes into the outer surface to provide a recessed coating. The thickness of the wear resistant coating determines the wear life of the track pin bushing and can be any desired thickness, with a thicker coating promoting a longer wear life. In an exemplary embodiment, the wear-resistant coating has a thickness of approximately 1–2 mm.

In exemplary embodiments, the wear-resistant coating is a fused alloy that is substantially harder and more wear-resistant than the steel typically used for tools, gears, engine parts, farm implements, and so forth., e.g., 1045 grade steel even in the hardened conditioned. Further, the wear-resistant coating preferably contains substantially no inclusions, such that the wear-resistant coating is uniformly dense and less brittle and more durable than that obtained in the prior work, such as Alessi, U.S. Pat. No. Re. 27,851.

Commonly owned U.S. Pat. No. 5,879,743, the entire contents of which are incorporated herein by reference, discloses such a wear-resistant alloy. Additionally, slurry and coating techniques incorporating the slurry that are suitable for use in the present invention are disclosed. For example, the fusible hard metal alloy in exemplary embodiments is preferably at least 60% of a transition metal of Group VIII of the Periodic Table, such as iron, cobalt, or nickel. However, the hard metal alloy may be based on other metals so long as the alloys have the physical properties stated above. Minor components (about 0.1 to about 20 wt. %) typically are boron, carbon, chromium, iron (in nickel and cobalt-based alloys), manganese, nickel (in iron and cobalt-based alloys), silicon, tungsten, molybdenum, one or more carbide forming elements, or combinations thereof. Elements in trace amounts (less than about 0.1 wt. %), such as sulfur, may be present as de minimis, contaminants. In exemplary embodiments, the alloy has a Vickers Hardness (HV) as high as 950 to 1250 HV. The hard metal alloy has a fusion temperature which is lower than the melting point of the metal that is to be coated, e.g., about 1110° C. or less, and is preferably, between about 900° C. and about 1200° C.

A method for hardfacing with a wear-resistant coating a metal surface of a part formed of a carburized metal is provided. In a preferred exemplary method, the carburized metal is removed from a portion of the metal surface prior to quenching to a depth sufficient to expose a non-carburized layer of the metal. The metal can be removed by any suitable technique, such as machining, cutting, lathing, grinding, and polishing. The exposed portion defines an area to be coated. In exemplary embodiments, the exposed portion is defined by an annular groove, indentation, or other well or cavity-like feature having a smaller radius than the radius of the original metal surface. A slurry of a hard metal alloy is then coated on this area and a metallurgical bond is formed between the non-carburized layer and the coated unfused slurry by fusing the hard metal alloy, thereby forming the wear-resistant coating.

Alternatively, an exemplary method prepares the surface of the metal part, i.e., the surface of the track pin bushing, by decarburizing the surface for a suitable period of time to reduce and, at long time periods, remove carbon from the surface of the metal part to a desired depth. In one aspect, decarburization occurs in the surface layer to a depth such that the subsequent metallurgical bond only occurs with decarburized metal. For example, decarburization of the carburized layer occurs to a depth of 0.002–0.003 inch (50–75 microns) to a carbon level of 0.4–0.6 wt. %. In another aspect, decarburization occurs to a depth of at least the thickness of the carburization layer +0.5 mm, i.e., to 3.0 mm for a typical track pin bushing that is carburized to a depth of 2.5 mm.

The slurry is aqueous-based and can be formed of polyvinyl alcohol (PVA) and a fusible, hard metal alloy in the form of a finely divided powder. Examples of a suitable slurry are disclosed in commonly owned U.S. Pat. No. 5,879,743, the entire contents of which are incorporated herein by reference. As discussed herein and disclosed in the '743 patent, the hard metal alloy can be a transition metal of Group VIII of the Periodic Table, such as iron, cobalt, nickel, or alloys thereof. In an exemplary embodiment, the hard metal alloy is in the form of a finely divided powder having a sufficiently small particle size to form a uniform slurry. Typical particle sizes range from about 90 mesh to about 400 mesh. Preferably, the average particle size is finer than about 115 mesh and, most preferably, finer than about 200 mesh. The powder can be a mixture of powders of different particle sizes.

Further, the slurry used is prepared by thoroughly mixing the powdered, hard metal alloy with the polyvinyl alcohol binder solution to give the desired alloy to binder solution weight ratio, as described in commonly owned U.S. Pat. No. 5,879,743, the entire contents of which are incorporated herein by reference.

The slurry can be applied in any suitable manner. For example, the slurry can be spray coated, spun cast, dipped, poured, or spread, i.e., applied with a brush or a doctor blade.

In one exemplary embodiment of a method for hardfacing a metal surface with a wear-resistant coating, a substantially uniform aqueous slurry of polyvinyl alcohol and a fusible, hard metal alloy in the form of a finely divided powder is formed and coated on the metal surface. The aqueous slurry is then dried, preferably by applying external heat, to leave a solid layer of the fusible, hard metal alloy in a polyvinyl alcohol matrix on the metal surface. The steps of coating the metal surface and drying the slurry to leave a solid layer may be repeated one or more times to build up a thicker coating of the slurry material.

In another exemplary embodiment of a method for hardfacing a metal surface with a wear-resistant coating, the metal surface is coated with an aqueous polyvinyl alcohol solution and a substantially uniform layer of a fusible, hard metal alloy in the form of a finely divided powder is distributed onto the coating of the polyvinyl alcohol solution before the polyvinyl alcohol solution dries. The steps of coating the metal surface, distributing the fusible hard metal alloy, and drying the slurry or the solution coating to leave a solid layer may be repeated one or more times to build up a thicker coating of the slurry material.

In an exemplary embodiment of the method of the present invention, the preferred procedure for applying a slurry to the metal surface to be coated depends on the shape and size of the metal item having the metal surface as well as the ratio of hard metal alloy and the concentration of the polyvinyl alcohol binder solution. Typically, the unfused slurry is poured, brushed, or sprayed on the metal surface to be protected, or the item having the metal surface to be protected can be dipped into the unfused slurry.

Dipping, pouring, and brushing is useful for forming relatively thick coatings, e.g., greater than 1 mm, in a short period of time, although repeated spaying can also be used to build up a thick layer over a longer period of time. For these procedures, preferably the ratio of hard metal alloy to PVA solution is in the range of about 4:1 to about 8:1 and the concentration of PVA solution is about 1% to about 15% PVA by weight. For example, 0500/0250 and 0600/0250 or similar slurries are suitable for this procedure. The representation xxxx/yyyy indicates the slurry parameters, where xxxx=weight ratio of powdered alloy to polyvinyl alcohol and yyyy=weight percent of polyvinyl alcohol present in the aqueous solution as a binder. Note that a decimal point is implicit after the first two digits in the representation. Thus, 0500 represents 5.0. Thick slurry compositions, i.e., a high ratio of alloy to PVA solution, can be applied as a squeezable paste, or can be rolled into tapes for bonding to the metal surface. For these procedures, preferably the ratio of alloy to PVA solution is in the range of about 8:1 to about 15:1 by weight and the concentration of PVA solution is about 2% to about 15% PVA by weight. In the above procedures, special additives can function as dispersants, suspending agents, and plasticizers.

In addition to the above methods of applying the coating, paste and tape methods can be used for thick coatings. However, these procedures are difficult to adapt to a high speed production environment. Accordingly, when a thick coating is desired, a reliable and economical alternative to paste and tape is a multiple coating procedure which produces uniformly thick slurry coatings even on large surfaces. The required thickness can be built by repeated spraying with intervening drying cycles. The drying may be done at about 80° to about 120° C. in, for example, a forced circulation air oven. A 0500/0250 slurry is particularly suitable for this method, though other formulations may be used.

The thickness of the coated unfused slurry can be adjusted by a shrinkage factor to result in a desired final thickness after metallurgical bonding, i.e., the final thickness can be flush to the outer diameter, protruding from, or recessed into the outer diameter of the metal piece. For example, the slurry described herein was found to have a shrinkage factor of about 0.55±0.05. Accordingly, the thickness of the slurry before fusing can be adjusted according to the shrinkage factor to result in a desired final thickness of the wear-resistant coating, e.g. an unfused slurry layer of 1.67 to 2.0 times the final thickness is used.

Bonding is the step of forming a metallurgical bond between the dried coated slurry and the metal part, i.e., the portion of the metal part that has been decarburized and/or, preferably, that has had a portion of the carburized metal removed to expose a non-carburized surface. For example, the metal surface coated with the layer of fusible, hard metal alloy in the polyvinyl alcohol matrix or coated with the aqueous polyvinyl alcohol solution with the layer of fusible, hard metal alloy can be heated to the fusing temperature of the hard metal alloy under a protective atmosphere until the hard metal alloy has fused onto the metal surface. Heating occurs in a controlled atmosphere, i.e., an inert or reducing atmosphere, excluding nitrogen which nitrides the alloy. For example, a partial pressure of He or Ar in a vacuum furnace forms a slight positive pressure, i.e., about a few inches of water above atmospheric pressure, or Ar, He or $H_2$ in a belt furnace are suitable for use during fusing. Subsequently, the metal surface with the fused hardfacing is cooled to ambient temperature.

In one example of the bonding process, the track pin bushing is heated to a temperature of about 1110° C. The heating is done in a belt type conveyor furnace at a hydrogen pressure slightly above atmospheric, and the track pin bushing is held at about 1065° C. to about 1075° C. for approximately 2–5 minutes and then cooled.

In further exemplary embodiments, after metallurgically bonding the slurry to the metal part to form the wear-resistant coating, the remaining carburized metal of the metal part can be hardened to a desired hardness by quenching. For example, the remaining carburized metal can be hardened by a thermal treatment that increases hardness as compared to the uncarburized metal. In an exemplary embodiment where the metal part is a track pin bushing, the remaining carburized metal corresponds to at least one of the inner surface of the track pin bushing, the first end of the track pin bushing, and/or the second end of the track pin bushing.

Experiments were conducted to study the effect of carburization on slurry bond formation. Small low carbon steel track pin bushings with a 10 mm wall thickness were carburized and air cooled. The carburization layer was approximately 2–2.5 mm in thickness. These samples were then reheated to 1600° F., in a decarburizing, i.e., low carbon potential, atmosphere for 0, 1, 2, and 3 hours resulting in decarburized layers of thickness 0.0006, 0.0005–0.0007, 0.001 0.0012, and 0.001–0.0015 inches, respectively. The decarburized samples were slurry coated with a fusible, hard metal slurry and bonded following the procedures outlined above. Additional details of slurry coating and bonding can be found in U.S. Pat. No. 5,879,743, the contents of which are herein incorporated by reference.

Subsequent to coating and bonding, the steel/slurry interface was examined in an optical microscope. The integrity of the bond improved as the decarburization time increased, suggesting that the steel alloy with increased depth of decarburization and/or the steel alloy with the lower carbon content more readily bonded with the slurry. However, the bushings showed evidence of flow of slurry coating during fusing due to gravity, though the tendency to flow decreased with the increase in the decarburization layer thickness.

These results indicate that decarburization can be used prior to slurry coating to improve bonding results. However, the decarburization process has at least two disadvantages: Decarburization on a partial surface (for example, only on an outer diameter and not on an inner diameter and/or the end faces) is not practical, and the time required for sufficient decarburization to occur, i.e., for an adequate decarburized layer to form on which to coat the unfused slurry is upwards of several hours, perhaps as long as 7–10 hrs, which can be economically unviable.

In the preferred exemplary method, carburized material is removed by, for example, machining, cutting, lathing, grinding, and or polishing, to expose a non-carburized layer. In experiments corresponding to this method, four track pin bushings had their outer diameters reduced by machining. The amounts removed were 3.00, 3.35, 3.75, 4.00 mm, respectively. The samples were then coated in the exposed area with a hard metal slurry and bonded following the procedures outlined above.

Visual examination of the bonding region indicated a good coating bond with no gravity flow during fusing. Optical microscopy of sectioned bushings showed a steel/slurry coating interfacial bonding region without inclusions and with good metallurgically bonding for all samples. Removal of a carburized layer sufficient to expose an uncarburized layer, in this case approximately 3 mm of material, was therefore concluded to result in good bond formation. This conclusion was further substantiated by a third experiment in which a track pin bushing was subject to a normalizing heat treatment and a 3 mm depth was machined from the outer diameter of the cross-section of the machined bushing. Optical microscopic examination showed that the carburized layer was completely removed by this machining and the exposed surface had a microstructure corresponding to the precarburization microstructure.

In a still further experiment, track pin bushings with 2 mm carburized case were machined on a portion of the axial length of the outer surface to a depth of 2.5 mm to remove the carburized case and the area was slurry coated. Coating was accomplished by the use of a hand-held sprayer and a hand-operated fixture to obtain a substantially uniform coating thickness. The hand operated fixture resembled a spindle on which the pieces were axially mounted and a hand crank for manual operation, although machine powered rotation could be used as well as automated techniques such as computer controlled equipment, i.e., rotation equipment, spraying equipment, robotics, and so forth. The unfused slurry surface was then machined on a lathe to make it smooth and concentric with the bore of the track pin bushing. Slurry thickness before fusing was adjusted to yield 1 mm or 1.5 mm fused thickness, based on the shrinkage factor, i.e., the empirically derived relationship that the fused thickness is about 0.55 times the unfused thickness. This machining operation, as was found after fusing, also helped produce a coating with a smooth surface and uniform thickness.

The track pin bushings with machined and cooled surfaces were fused using a suitable time-at-temperature (T-t) cycle. In exemplary embodiments, the T-t cycle is conducted in a vacuum furnace or a belt furnace under a controlled atmosphere, i.e., an inert or reducing atmosphere, excluding nitrogen which nitrides the alloy. A partial pressure of He or Ar in a vacuum furnace or a slight positive pressure, i.e., about a few inches of water above atmospheric pressure, of Ar, He or $H_2$ in a belt furnace are good examples. The track pin bushings were placed with the axes vertical in the furnace chamber, and the maximum temperature and the time at maximum temperature were carefully selected and monitored to prevent downward gravity flow of fused semi-liquid slurry metal.

An example of a suitable T-t cycle is as follows: gradually heat the track pin bushing at 10–15° C. per minute to 1080–1110° C., hold the temperature for 1–5 minutes, preferably 1–2 minutes, and cool the track pin bushing at any desired cooling rate, i.e., using a recirculating fan.

Visual observation of representative samples of wear-resistant coated track pin bushings prepared by the preferred exemplary method revealed that the coating surface was smooth, representing the surface finish of the machined slurry surface before fusing. Further, the coating on the track pin bushings fused and bonded to the substrate without any noticeable gravity flow. Measurements using a micrometer showed that the track pin bushings did not undergo any noticeable distortion. In a follow-on investigation, a wear-resistant coated track pin bushing was ground using a silicon carbide grinding wheel and the ground surface examined under an optical microscope. The wear-resistant coating was found to be free from porosity.

The wear resistance was also evaluated for the wear-resistant coatings used for track pin bushings. Rubber wheel-sand abrasion tests revealed that the fused slurry coating wears at about $\frac{1}{6}^{th}$ the rate of quenched 1080 steel. Thus, a ⅓ mm fused slurry displayed, as a first approximation, the wear equivalent to a 2 mm thick layer of hardened 1080 steel.

As a result of the above series of experiments, the following generalized procedures for manufacture of slurry coated track pin bushings with a final outer diameter of D mm was determined:

1. Machine the track pin bushing per part drawing for the particular application and/or environment of use except that the outer diameter is increased beyond the desired final outer diameter to allow removal of material. In an exemplary embodiment of the track pin bushing described herein, the outer diameter is D+3.0 mm.
2. Carburize at least a portion of the track pin bushing.
3. Remove material from at least a portion of the carburized surface. In this example the carburized surface is the outer surface. Thus, at least a portion of the outer diameter surface is removed to at least expose a non-carburized layer. In addition, the outer diameter can be optionally further reduced to accommodate the desired thickness of the wear resistant coating. In the track pin bushing of the preferred exemplary embodiment, the least portion of the outer diameter after removal of the material is D-3.0 mm. Thus, this step removes approximately 6 mm of material from an area on the carburized outer diameter surface.
4. Coat the exposed surface of the track pin bushing with the hard metal slurry to a thickness (before fusing) to obtain a desired outer diameter before fusing. For example, coat the exposed surface of the track pin bushing to a thickness of 2.75 mm, i.e., thickness equal to a diameter of (D-3 mm)+2.75×2. This corresponds to an outer diameter of D+2.5mm.
5. Fuse the slurry to form a metallurgical bond between the exposed non-carburized layer and the slurry. In the case of the preferred embodiment of the track pin bushing described herein, the fused slurry thickness was 2.75×0.55 or 1.5 mm and the final bushing diameter was D, the desired diameter. Here the factor 0.55 is an experimentally established shrinkage factor for the slurry coating thickness.

Figure 4:
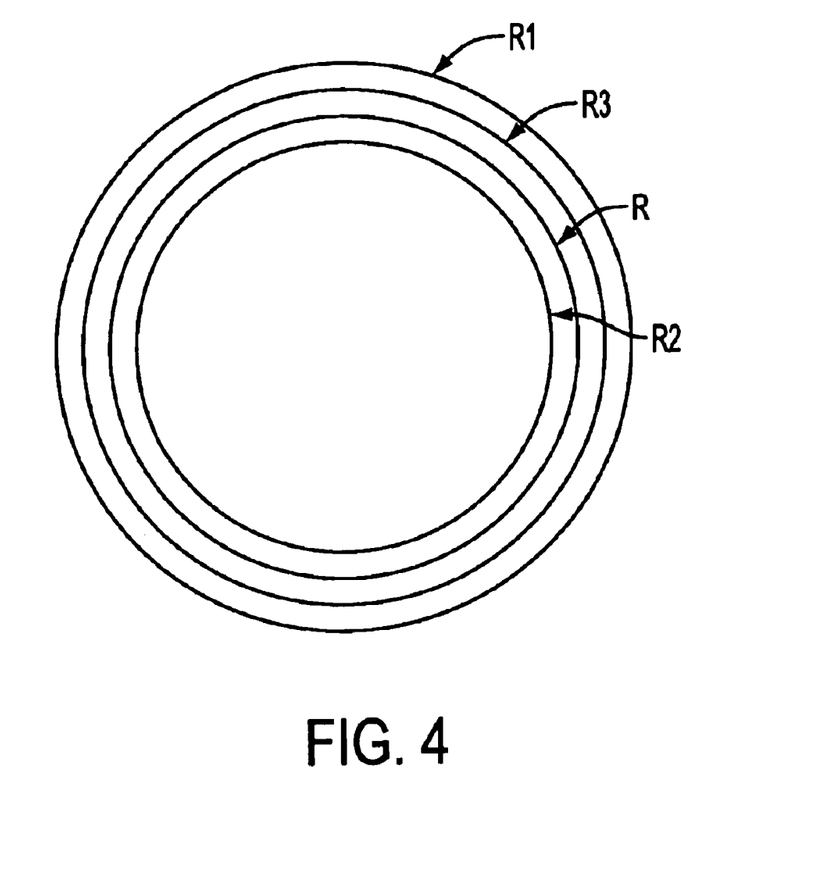
FIG. 4 shows a radial cross-section schematic representation of the radius variation during the method of hardfacing a track pin bushing with a wear-resistant coating.

In a further generalized procedure, the following relationships, referring to FIG. 4, were determined for a track pin bushing:

$$R_1 = R - X + Y + 0.5 \quad \text{Eq. 1}$$

$$R_2 = R - X \quad \text{Eq. 2}$$

$$R_3 = R + 0.82X \quad \text{Eq. 3}$$

wherein R is the final finished radius of the track pin bushing, i.e., $R = R_2 + X$, $R_1$ is the outer radius of the track pin bushing as carburized, $R_2$ is the outer radius of the track pin bushing after removal of the carburized layer to expose a non-carburized layer and assuming the machined depth is 0.5 mm greater than the carburized depth, i.e., $R_2 = R_1 - (Y + 0.5)$, $R_3$ is the outer radius of the track pin bushing after slurry coating and before fusing, X is the thickness of the slurry coating after fusing assuming a shrinkage factor of 0.55 for the slurry coating during the fusing process, i.e., $X = 0.55(R_3 - R_2)$, and Y is the thickness of the carburized layer. All measurements are in millimeters (mm).

From the above, Equations 1–3 give the outer radius of the carburized track pin bushing, the outer radius after machining and the outer radius after slurry coating but before fusing, respectively, in terms of final track pin bushing outer surface radius R, if values of thickness of fused slurry layer, X, and carburized depth, Y, are known.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A track pin bushing for cooperating with a track pin in an endless track, the track pin bushing comprising:
   a tubular body formed of an iron-based alloy with a first end and a second end, an outer surface that is case-hardened in at least a section thereof, and an inner surface having an inner diameter, wherein the inner diameter defines the circumference of an axial bore extending from the first end to the second end and at least a portion of the outer surface has been removed to a depth sufficient to expose a non-carburized layer of the iron-based alloy; and
   a wear-resistant coating metallurgically bonded to said non-carburized layer, the wear-resistant coating comprising a fused, hard metal alloy comprising at least 60% iron, cobalt, nickel, or alloys thereof.

2. A track pin bushing for cooperating with a track pin in an endless track, the track pin bushing comprising:
   a tubular body formed of an iron-based alloy with a first end and a second end, an outer surface that is case-hardened in at least a section thereof, and an inner surface having an inner diameter, wherein the inner diameter defines the circumference of an axial bore extending from the first end to the second end and at least a portion of the outer surface has been removed to a depth sufficient to expose a non-carburized layer of the iron-based alloy; and
   a wear-resistant coating metallurgically bonded to said non-carburized layer, the wear-resistant coating comprising a fused, hard metal alloy comprising at least 60% iron, cobalt, nickel, or alloys thereof,
   wherein said portion of the outer surface that has been removed corresponds to a contact surface adapted to engage with a drive sprocket in the endless track of a track-type machine.

3. A track pin bushing for cooperating with a track pin in an endless track, the track pin bushing comprising:
   a tubular body formed of an iron-based alloy with a first end and a second end, an outer surface that is case-hardened in at least a section thereof, and an inner surface having an inner diameter, wherein the inner diameter defines the circumference of an axial bore extending from the first end to the second end and at least a portion of the outer surface has been removed to a depth sufficient to expose a non-carburized layer of the iron-based alloy; and a wear-resistant coating metallurgically bonded to said non-carburized layer, the wear-resistant coating comprising a fused, hard metal alloy comprising at least 60% iron, cobalt, nickel, or alloys thereof, wherein a Vickers hardness of the wear-resistant coating is greater than 950 HV.

4. A track pin bushing for cooperating with a track pin in an endless track, the track pin bushing comprising:

a first end and a second end;

an inner surface having an inner diameter, wherein the inner diameter defines the circumference of an axial bore extending from the first end to the second end;

an outer surface having a varying diameter; and a wear-resistant coating disposed on a first portion of the outer surface and metallurgically bonded to the track pin bushing, the wear-resistant coating comprising a fused, hard metal alloy comprising at least 60% iron, cobalt, nickel, or alloys thereof, wherein the wear resistant coating has a thickness of approximately 1.5 mm, wherein the varying diameter of the outer surface includes a first outer diameter at a first end section and a second end section and a second outer diameter at a middle section therebetween, wherein the second outer diameter is greater than the first outer diameter, wherein the outer surface includes an annular groove located in at least a portion of said middle section and extending over a majority of an axial length of said middle section and wherein the wear resistant coating is disposed in said annular groove, and wherein the track pin bushing is an iron-based alloy and at least the middle section in which the annular groove is not located is carburized and quenched and the annular groove has a depth sufficient to expose a non-carburized layer of the iron-based alloy.

5. The track pin bushing of claim 4, wherein the wear-resistant coating has an outer surface flush with the outer surface of the track pin bushing.

6. The track pin bushing of claim 4, wherein the track pin bushing is an iron-based alloy and at least one of the first end, second end, and inner surface is case hardened.

7. A method for hardfacing with a wear-resistant coating a metal surface of a carburized metal part, the method comprising the steps of:

removing the carburized metal from at least a portion of the metal surface to a depth sufficient to expose a non-carburized layer of the metal, the portion defining an area to be coated;

coating the area with a slurry comprising a fusible, hard metal alloy with at least 60% iron, cobalt, nickel, or alloys thereof in the form of a finely divided powder and polyvinyl alcohol; and forming a metallurgical bond between the area and the coated slurry to form the wear-resistant coating.

8. The method of claim 7, wherein the step of removing comprises one or more of machining, lathing, grinding, and polishing.

9. The method of claim 7, further comprising a step of:

adjusting a thickness of the coated slurry to an unfused thickness of from 1.67 to 2.0 times a final (i.e., fused) thickness of the wear-resistant coating.

10. The method of claim 7, wherein the step of forming a metallurgical bond comprises drying the coated slurry, heating the metal part to a fusion temperature of the fusible, hard metal alloy in a controlled atmosphere of at least one inert gas or reducing gas excluding nitrogen, and cooling the metal part to ambient temperature.

11. The method of claim 7, further comprising subsequently quenching the carburized metal part to case harden the carburized metal that remains after the step of removing such that a non-coated surface has an increased hardness as compared to the carburized metal.

12. The method of claim 7, wherein the metal part is a component of an endless track or a component of an undercarriage in a track-type machine.

13. The method of claim 12, wherein the metal part is a track pin bushing.

14. A method for hardfacing a metal surface of a track pin bushing with a wear-resistant coating, the track pin bushing comprising an outer surface having an outer diameter, an inner surface having an inner diameter, a first end and a second end, wherein the inner diameter defines the circumference of an axial bore extending from the first end to the second end and cooperating with a track pin in an endless track, the method comprising the steps of:

carburizing at least a portion of the track pin bushing to produce a surface having a carburized depth;

preparing at least a portion of the carburized surface of the track pin bushing in an area to be coated by removing the carburized metal to a depth sufficient to expose a decarburized layer;

coating the exposed decarburized layer of the track pin bushing with a slurry comprising a fusible, hard metal alloy with at least 60% iron, cobalt, nickel, or alloys thereof in the form of a finely divided powder and polyvinyl alcohol;

forming the wear-resistant coating by metallurgically bonding the exposed decarburized layer and the slurry; and case hardening a non-prepared and carburized surface of the track pin bushing by quenching.

15. The method of claim 14, further comprising a step of adjusting a thickness of the slurry to have an outer surface that is concentric with the axial bore, wherein the thickness of the concentric slurry coating is from 1.67 to 2.0 times a final thickness of the wear-resistant coating.

16. The method of claim 14, wherein the depth is at least 3 mm.

17. The method of claim 14, wherein the step of preparing comprises removing by one or more of machining, lathing, grinding, and polishing.

18. The method of claim 14, wherein the step of forming the wear-resistant coating by metallurgical bonding comprises drying the slurry, heating the metal surface of the track pin bushing to a fusion temperature of the fusible, hard metal alloy in a controlled atmosphere of at least one of an inert gas or a reducing gas excluding nitrogen, and cooling the track pin bushing to ambient temperature.

19. The method of claim 14, wherein the non-prepared and carburized surface is at least one of the inner surface of the track pin bushing, the first end of the track pin bushing, and the second end of the track pin bushing.

20. A method for hardfacing a metal surface of a track pin bushing with a wear-resistant coating, the method comprising:

forming the track pin bushing having a first end and a second end, an inner surface having an inner diameter, wherein the inner diameter defines the circumference of an axial bore extending from the first end to the second end, an outer surface having a first outer diameter at a first end section and a second end section and a second outer diameter at a middle section therebetween, the second outer diameter being greater than the first outer diameter;

carburizing the track pin bushing to produce a carburized outer surface, inner surface and first and second end sections, each with a carburization depth;

removing carburized steel from at least a portion of said middle section to reduce the second diameter by at least the carburization depth, coating said middle portion in the area of the reduced diameter with a slurry comprising a fusible, hard metal alloy with at least 60% iron, cobalt, nickel, or alloys thereof in the form of a finely divided powder and polyvinyl alcohol;

adjusting a thickness of the slurry to have an outer surface that is concentric with the axial bore, wherein the thickness of the concentric outer surface is from 1.67 to 2.0 times a final thickness of the wear-resistant coating;

forming the wear-resistant coating by metallurgically bonding said portion of said middle portion and the slurry; and case hardening at least the inner diameter and first and second ends.

21. The method of claim 20, wherein the carburization depth is approximately 3.0 mm.

22. The method of claim 20, wherein the step of removing comprises one or more of machining, lathing, grinding, and polishing.

23. The method of claim 20, wherein the step of forming the wear-resistant coating by metallurgical bonding comprises drying the slurry, heating the metal surface of the track pin bushing to a fusion temperature of the fusible, hard metal alloy in a controlled atmosphere of at least one of an inert gas or a reducing gas excluding nitrogen, and cooling the track pin bushing to ambient temperature.

24. A track pin bushing in combination with a track pin for connecting adjacent track links in an endless track of a crawler track, the track pin bushing including an axial bore therethrough in which is positioned the track pin, the track pin bushing comprising:

a tubular body formed of a case hardened iron-based alloy with a first end and a second end, an outer surface, and an inner surface having an inner diameter, wherein the inner diameter defines the circumference of the axial bore extending from the first end to the second end and a portion of the outer surface has been removed to a depth sufficient to expose a non-carburized layer of the iron-based alloy; and a wear-resistant coating metallurgically bonded to said portion, the wear-resistant coating comprising a fused, hard metal alloy comprising at least 60% iron, cobalt, nickel, or alloys thereof.

25. A track pin bushing for cooperating with a track pin in an endless track, the track pin bushing comprising:

a tubular body formed of an iron-based alloy with a first end and a second end, an outer surface that is case-hardened in at least a section thereof, and an inner surface having an inner diameter, wherein the inner diameter defines the circumference of an axial bore extending from the first end to the second end and at least a portion of the outer surface has been removed to a depth sufficient to expose a non-carburized layer of the iron-based alloy; and a wear-resistant coating metallurgically bonded to said non-carburized layer, the wear-resistant coating comprising a fused, hard metal alloy comprising at least 60% iron, cobalt, nickel, or alloys thereof, wherein said portion of the outer surface that has been removed is on a circumferential surface of the outer surface.

26. The track pin bushing of claim 25, wherein said portion of the outer surface that has been removed is less than the entire circumferential surface of the outer surface.

27. The track pin bushing of claim 25, wherein said portion of the outer surface that has been removed corresponds to a contact surface adapted to engage with a drive sprocket in the endless track of a track-type machine.

28. The track pin bushing of claim 25, wherein a Vickers hardness of the wear-resistant coating is greater than 950 HV.

29. A track pin bushing for cooperating with a track pin in an endless track, the track pin bushing comprising:

a tubular body formed of an iron-based alloy with a first end and a second end, an outer surface, and an inner surface having an inner diameter, wherein the inner diameter defines the circumference of an axial bore extending from the first end to the second end, the tubular body having a first wear protection region and a second wear protection region, wherein the first wear protection region includes a carburized portion of the outer surface, and wherein the second wear protection region includes a wear-resistant coating metallurgically bonded to a non-carburized layer of the tubular body, the wear-resistant coating comprising a fused, hard metal alloy comprising at least 60% iron, cobalt, nickel, or alloys thereof.

30. The track pin bushing of claim 4, wherein at least one of the first end, second end, inner surface, first end section and second end section is case hardened.

* * * * *